May 23, 1933.  R. H. COLVIN  1,910,753
WATER SOFTENER VALVE
Filed Feb. 6, 1929  3 Sheets-Sheet 1
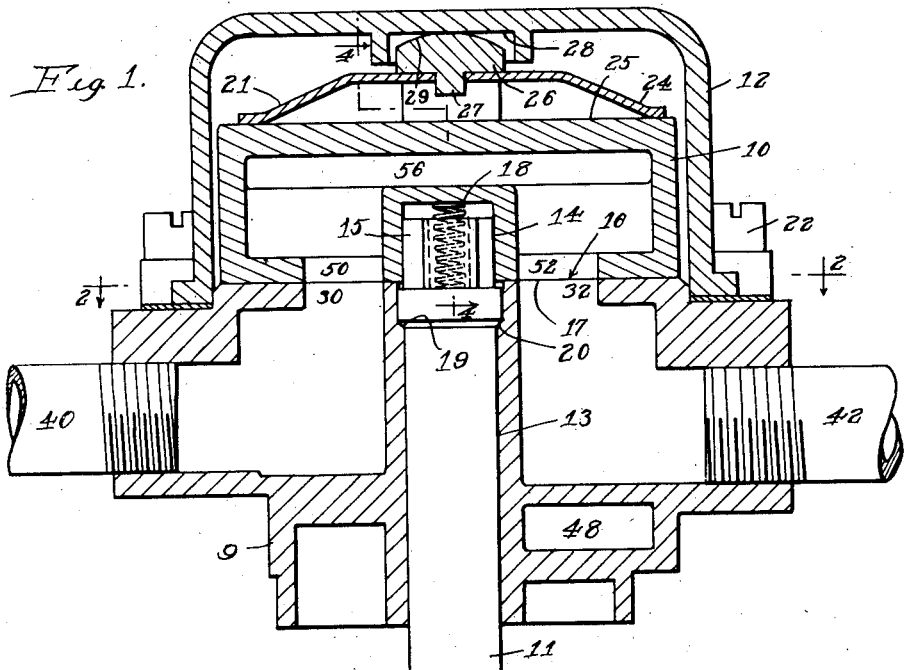
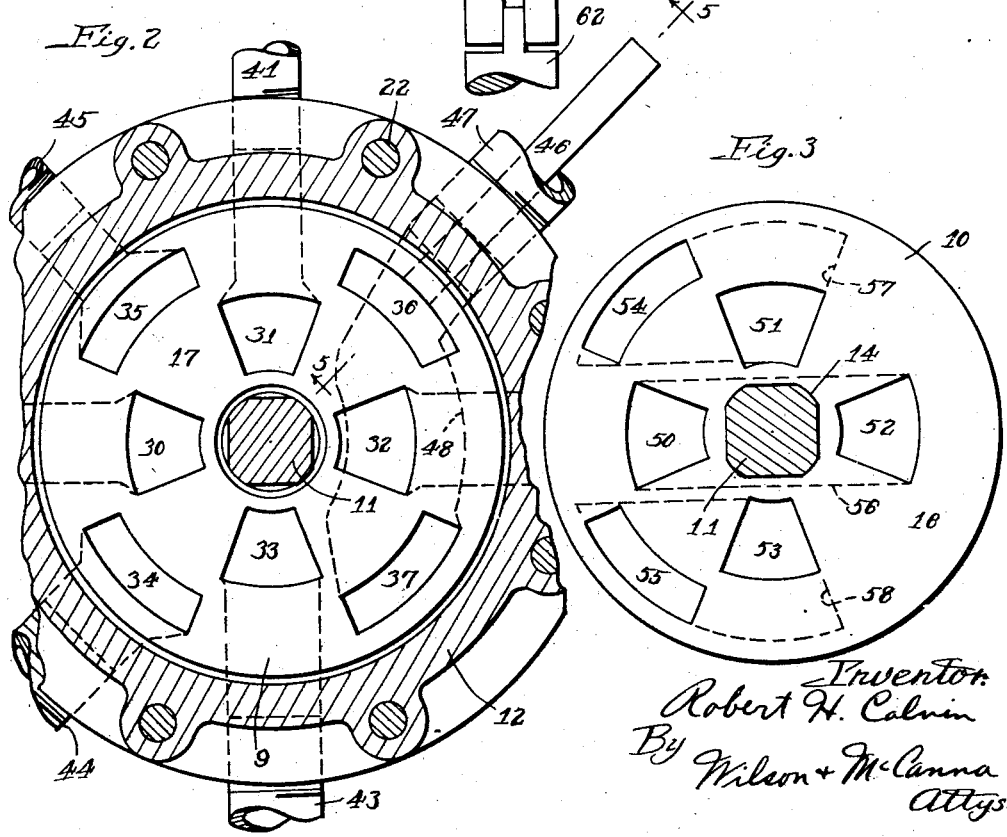

May 23, 1933.   R. H. COLVIN   1,910,753
WATER SOFTENER VALVE
Filed Feb. 6, 1929   3 Sheets-Sheet 2
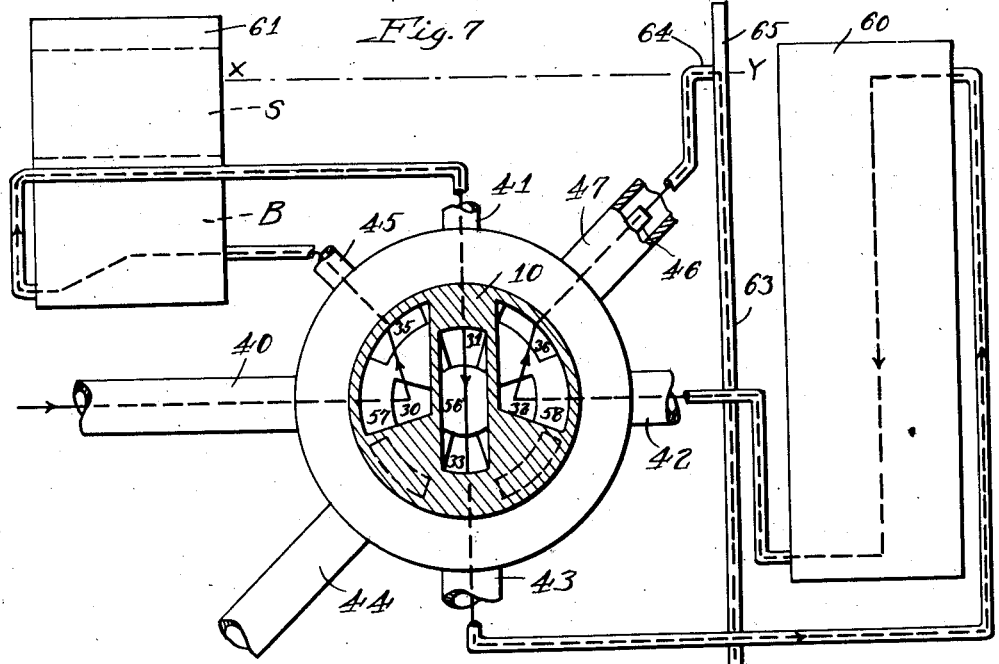
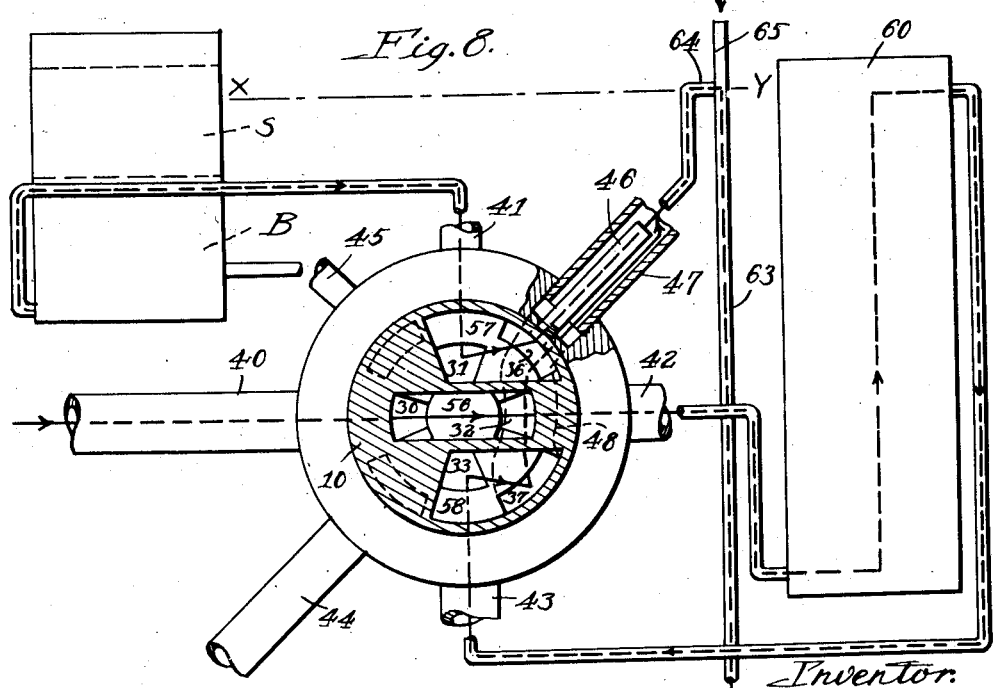
Inventor:
Robert H. Colvin
By Wilson & McCanna
Attys.

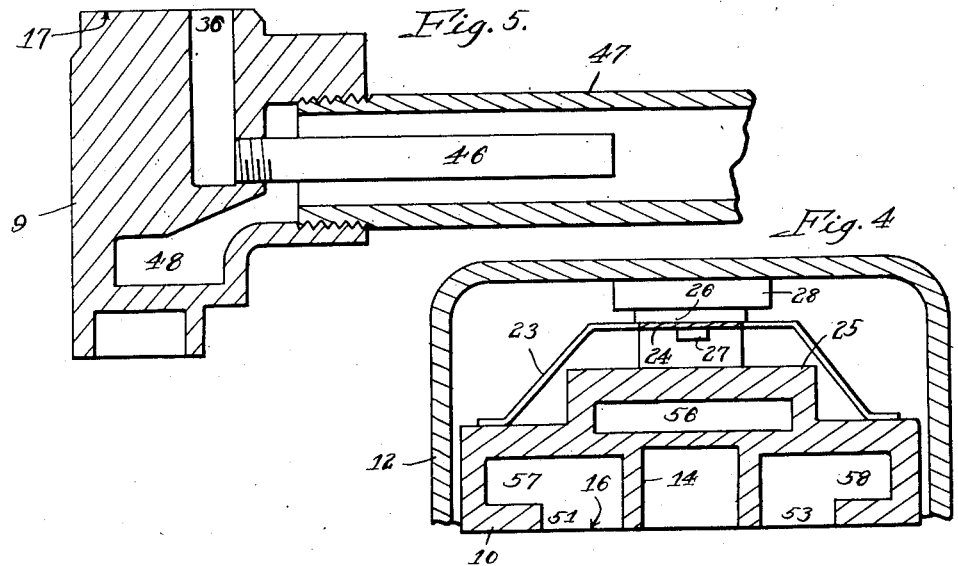
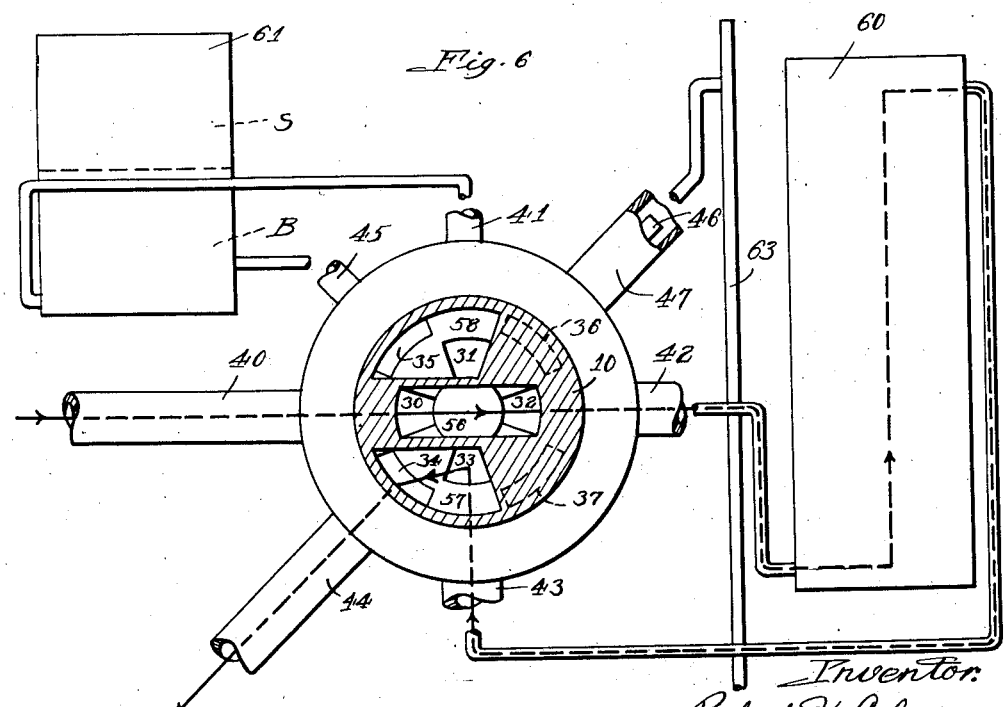

Patented May 23, 1933

1,910,753

UNITED STATES PATENT OFFICE

ROBERT H. COLVIN, OF ROCKFORD, ILLINOIS, ASSIGNOR, BY MESNE ASSIGNMENTS, TO THE PERMUTIT COMPANY, OF WILMINGTON, DELAWARE, A CORPORATION OF DELAWARE

WATER SOFTENER VALVE

Application filed February 6, 1929. Serial No. 337,754.

This invention relates to valves and has particular reference to a multi-port, plate type valve for water softeners.

The well recognized advantages in the use of a single multi-port valve over a plurality of valves in controlling the functioning of a water softener have led to the development of various valves of different designs with which I am familiar. The principal objections to these valves have been that they either were hard to turn or were apt to develop leaks. It is, therefore, the principal object of my invention to provide a valve designed as much with a view to ease of operation as proof against leakage, so as to give good service and seldom, if ever, require any attention. The valve is therefore well adapted for use with automatic or semi-automatic softeners, the method of operation of which naturally contemplates the necessity for very little attention on the part of the owner, the same being designed to go through its cycle repeatedly under meter or clock control entirely automatically or semi-automatically as the case may be, although, of course, a valve of this kind might be used with a softener where the operation of the valve is arranged to be taken care of by hand.

A special feature of the valve of my invention, aside from a novel and particularly advantageous arrangement of ports in the rotor and stator parts, lies in the provision of a cap on the stator enclosing the rotor, making the valve absolutely water-tight, and a cross-shaped flat leaf spring acting between the cap and the rotor to hold the rotor seated on the stator under a pressure at least equivalent to the hydrostatic pressure active on the rotor in any position thereof in operation tending to unseat the same. A button at the center of the spring bearing against the center of the cap and held in such position positively maintains the spring in proper position for even application of pressure to the rotor, and the stem for turning the rotor extends thereto through a center hole in the stator, making connection with the rotor at the center of the ported face thereof, in such a way that there is little danger of leakage along the stem.

The invention is illustrated in the accompanying drawings, wherein—

Figure 1 is a central vertical section through my improved valve;

Fig. 2 is a horizontal section on the line 2—2 of Fig. 1 looking down on the ported face of the stator;

Fig. 3 is a view taken on the same plane looking up at the ported face of the rotor;

Figs. 4 and 5 are fragmentary vertical sections on the broken line 4—4 of Fig. 1 and the line 5—5 of Fig. 2, respectively, and Figs. 6, 7 and 8 are diagrammatic views showing the connections established by the valve in softening position, salt wash position and rinse position respectively, the valve having the rotor part appearing in section in each of these views and the course of the water being indicated by heavy full and dotted lines.

The same reference numerals are applied to corresponding parts throughout the views.

The valve, generally speaking, comprises a cast stationary body 9, a cast rotary plate or disk 10, a stem 11 for turning the latter, and a cap 12 serving to enclose the same. Valves of this general description are well known and have been used for various purposes, and I am aware that it is old to have the stem 11 extend through a center hole 13 in the body 9, which for convenience, I will hereinafter refer to as the stator, for connection with the plate 10, which will hereinafter be referred to as the rotor. A center hole 14, approximately square in form, is provided in the rotor for reception of the squared end 15 of the stem 11 to provide a connection between the stem and rotor whereby the latter is arranged to be turned by means of the stem to turn the ported face 16 of the rotor relative to the ported face 17 of the stator. A coiled compression spring 18 in the hole 14 serves to communicate a slight endwise thrust to the stem to hold the shoulder 19 provided by a slight enlargement of the end of the stem in snug engagement with an annular seat 20 provided by the counterbored end of the hole 13 in the stator, whereby to minimize the danger of leakage along the stem, without necessitating the use of a stuffing box, which would involve too much friction in the turning of the stem to be consistent with easy operation of the valve.

In the valve of my invention I have avoided the use of hydrostatic pressure for keeping the rotor seated on the stator mainly for the reason that the torque required to turn a valve of that design varies too greatly with changes of pressure, being excessive for higher pressures. I have found that the use of a leaf spring gives a much more uniform torque and this is particularly desirable where the valve is to be automatically operated under pressure. A cross-shaped leaf spring 21 is provided between the rotor 10 and cap 12, placed under tension in the fastening of the cap 12 to the body 9 or stator by means of the cap screws 22. The spring 21 has two long legs 23 bearing at diametrically opposed points on top of the rotor 10 and two short legs 24 bearing at two other diametrically opposed points on top of a boss 25 projecting from the top of the rotor. The engagement of the legs 23 on top of the rotor on opposite sides of the boss 25 is enough to insure turning of the spring 21 with the rotor. A button 26 has a shank 27 fitting in a center hole provided in the spring 21 and fits in a socket 28 provided therefor on the inside of the cap 12. The spring 21 is, therefore, held in its proper position with relation to the rotor. The spring is a fairly heavy one, as appears in the drawings, and is flexed only very little in the bolting down of the cap, the flexing being, however, sufficient to place the rotor 10 under a pressure at least equivalent to the hydrostatic pressure active on the rotor in any position thereof tending to unseat the same. The top of the button 26 is suitably rounded, as shown at 29, so as to have point contact with the inside of the cap and thus minimize friction in the turning of the spring with the rotor, while at the same time insuring uniform distribution of the pressure of the spring to the rotor.

Referring now more particularly to Figs. 2 and 3, it will first of all be observed that the stator 9 has eight ports numbered 30 to 37. The four ports 30 to 33 are on a smaller radius than the four ports 34 to 37 so as to permit leaving sufficient lands therebetween and, while the last mentioned ports are more elongated than the first mentioned ports, the area of every port is approximately the same (being approximately equivalent to the internal cross-sectional area of the size of the pipe to which the valve is connected) and the included angle of every port has its apex at the center, all of the included angles being equal for both sets of ports. The included angle of each of the ports is less than the included angle of each of the lands therebetween for a purpose which will presently appear. The ports 30 to 33 are spaced 90° apart and the ports 34 to 37 are likewise spaced 90° apart, the latter being disposed at positions intermediate the former. The ports 30 to 33 have radial passageways communicating therewith cored in the stator to establish communication with pipes 40 to 43 respectively. The ports 34 and 35 have radial passageways communicating therewith cored in the stator serving to establish communication with pipes 44 and 45 respectively. The ports 36 and 37 are different from the rest, both being arranged to communicate with the same pipe 47, the port 36 by way of a small pipe 46 extending inside the pipe 47 for a short distance, as shown in Figs. 2 and 5, and the port 37 by way of an arcuate passage 48 cored in the stator and communicating at one end with the port 37 and at the other end with the pipe 47. It will next be observed that the rotor 10 has six ports numbered 50 to 55. The ports 50 and 52 are connected by a diametrically extending passageway 56 cored in boss 25 above the center hole 14. The ports 51 and 54 are in open communication with one another by reason of a passageway 57, and the ports 53 and 55 are likewise placed in open communication with one another by a passageway 58, these passageways being likewise cored in the rotor. It will be observed that the ports 50 to 53 are spaced similarly to the ports 30 to 33 and are of corresponding size, and that the ports 54 and 55 correspond similarly to the ports 34 and 35 as regards relationship with these other ports. There is also the same proportioning of the ports with reference to the lands therebetween adhered to in the case of the rotor as in the case of the stator. The object of this is to avoid the overlapping of ports in the turning of the rotor from one position to another.

In describing the operation of the valve, reference is made to Figs. 6, 7 and 8 wherein the valve is shown connected with a softener 60 and brine tank 61 in a somewhat similar manner as in the Sweeney Patent No. 1,693,829 issued December 4, 1928, the brine tank 61 being preferably of the same type as that shown in said patent, having an upper salt compartment S and a lower brine compartment B which are in open communication with one another only between regenerations. In the normal softening operation illustrated in Fig. 6, communication is established between the water supply pipe 40 and the service pipe 44 through the softener tank 60 as follows: From the supply pipe 40 through the ports 30 and 32, by way of the passage 56 in the rotor 10, through pipe 42 into the bottom of the softener tank 60 for passage upwardly through the mineral therein for softening. Leaving the tank through pipe 43 the softened water passes through ports 33 and 34, by way of the passage 57 in the rotor, into the service pipe 44. This operation continues for a predetermined capacity run after which the exhausted mineral in the softener tank has to be regenerated. The rotor of the the valve at that time is arranged to be shifted either manually, automatically, or semi-automatically, a shaft 62 being shown in Fig. 1 as having a connection with the slotted end of the stem 11 of the valve for that purpose. Referring to Fig. 7, which illustrates the salt wash operation, it will be observed that the rotor has been shifted in a clockwise direction through 90° from the softening position to establish the following circuit: The water supplied through pipe 40 passes through ports 30 and 35, by way of passage 57 in the rotor, and through pipe 45 into the brine compartment B of the brine tank 61 to expel the brine therefrom in the manner described in the Sweeney patent above referred to. A restriction is provided in the pipe 45 and this cuts down the rate of flow of the brine to an amount suitable for regeneration. The brine discharged from compartment B flows through pipe 41 and through ports 31 and 33, by way of passage 56 in the rotor, into the top of the softener tank 60 by way of pipe 43 for passage downwardly through the mineral in said tank. The mineral is revived by the action of the brine in a manner well known in this art and the spent brine issuing from the lower part of the softener tank passes through pipe 42 and through ports 32, and 36, by way of passage 58 in the rotor through the restriction pipe 46 for discharge into the pipe 47 leading to the waste pipe 63, which in turn leads to the sewer. Now let us assume that at some time previous to this regeneration the salt supply in the salt compartment S of the brine tank 61 was replenished so that the water level in said compartment is as high as indicated by the dotted line in Fig. 7, very near the rim of the tank. It will presently be made clear how the level is made to drop to the dot and dash line XY shown in Figs. 7 and 8, which corresponds to the level of the drain outlet 64. Upon the completion of the salt wash, the mineral in the softener tank 60 is arranged to be flushed by the violent passage of fresh water therethrough, preferably in the reverse direction to that of the brine flow, that is, in the same direction as the normal softening flow. The valve is therefore arranged to have the rotor thereof shifted through another 90° from the position shown in Fig. 7 to that shown in Fig. 8 for what is known as the rinse. The following circuit is thus established: Water flows from the supply pipe 40 through ports 30 and 32, by way of passage 56 in the rotor, through pipe 42 into the bottom of the softener tank 60 for passage upwardly through the mineral therein to rinse the same of any residual brine and also to wash out any hard water present in the tank above the mineral and replace the same by softened water, the water passing upwardly through the mineral being naturally softened by contact therewith. The waste water leaving the top of the tank flows through pipe 43 through ports 33 and 37, by way of passage 58 in the rotor, through passage 48 in the stator and out through pipe 47 for discharge into the waste pipe 63. The discharge end of the passage 48, as appears in Fig. 5, is somewhat restricted, just enough to cut down the flow of the flushing water to a point where there is bound to be no ejector action on the pipe 46. A parallel circuit is established through the valve in this rinse operation by virtue of which the water level in the brine tank is lowered to the level of the drain outlet 64. This circuit is as follows: The brine outlet pipe 41 communicates through ports 31 and 36, by way of passage 57 in the rotor with the restriction pipe 46, which, as stated before, discharges into the pipe 47. Fresh water, which has just previously been injected into the brine compartment B of the brine tank 61, is thus caused to flow therefrom until the level of the water in the brine tank is dropped to the level of the drain outlet 64. Any injector action which might be produced at the pipe 46 by reason of the flow of the flushing water through the pipe 47 about and past the end of the pipe 46 is prevented by limitation of the flow rate by the restriction in the passage 48 as stated above. There can be no siphoning action to bring the level of the water in the brine tank below the level of the drain outlet 64, because the waste pipe has a vent pipe 65 extending therefrom to a point above the level of the brine tank. Obviously, since the water level in the brine tank is maintained low enough to leave a definite head space in the salt compartment above the water level therein, there is no need for an overflow to the sewer since there is always sufficient space left to accommodate the usual salt charge without the likelihood of there being an overflow. That matter is fully discussed in the Sweeney patent mentioned above. Following the salt wash operation, the rotor is turned through another 180° in the same direction as before to bring it back to the softening position, and the cycle described is repeated indefinitely.

It is believed that the foregoing description conveys a clear understanding of the operation as well as the advantages of the valve of my invention. The appended claims have been drawn with a view to affording a degree of protection commensurate with the novelty presented.

I claim:

1. A valve comprising a body member having a plurality of ports in a flat face provided thereon, there being one set of ports in circularly spaced relation on one radius and another set of ports in circularly spaced relation on another radius, and a valve member having a flat face cooperating with the flat face of the body member, one of the two members constituting a stator and the other a rotor shiftable relative thereto to different positions, the valve member having three passages therein each communicating with two of six ports provided in the flat face thereon, four of said ports being disposed on the same radius as the one set of ports in the body member and in circularly spaced relation, and the other two ports being disposed on another radius the same as the other set of ports in the body member and in circularly spaced relation, the ports in the one member being arranged to register with different ports in the other member in different positions thereof.

2. A valve as set forth in claim 1 wherein the ports of one set in both members are offset angularly with reference to the ports of the other set to positions intermediate the same.

3. A valve as set forth in claim 1 wherein the ports of both sets in both members have the same included angle, the apex of which is at the common center of the two members, the lands between the ports in both members also having the same included angle, the included angle of the lands being greater than the included angle of the ports.

4. A valve as set forth in claim 1 wherein the ports of one set in both members are offset angularly with reference to the ports of the other set to positions intermediate the same, and wherein the ports of both sets in both members have the same included angle, the apex of which is at the common center of the two members, the lands between the ports in both members also having the same included angle, the included angle of the lands being greater than the included angle of the ports.

5. A valve comprising a body member having a flat face, and a valve member having a flat face provided thereon for cooperation with the flat face of the body member, the one member constituting a stator and the other a rotor shiftable to different positions with respect thereto, the one member having eight ports, four of which are in equally spaced relation on one radius and the other four of which are in equally spaced relation on a different radius and disposed intermediate the first ports, the ports of the one set having individual passages leading therefrom and two of the ports of the other set likewise having individual passages leading therefrom but the remaining two ports being in communication with a common passageway, and the other member having one set of four ports in equally spaced relation on one radius and another set of two ports on another radius intermediate ports of the other set, two of the ports of the set of four in diametrically opposed relation being interconnected by a passageway in said member and the remaining two ports being connected with the two ports of the other set by two passageways provided in said member, the ports in the one member being arranged to register with different ports in the other members in different positions thereof.

6. A valve as set forth in claim 5 wherein the two interconnected ports of the first mentioned member have communication with a pipe leading from said member, the one port having restricted communication with said pipe substantially as described.

7. A valve as set forth in claim 5 wherein all of the ports in the first mentioned member have the same included angle with the apex at the common center of the two members, the ports being of such size that the included angle of the lands between the ports is greater than the included angle of the ports themselves, and the ports in the other member adapted to register therewith being of corresponding size with the lands therebetween likewise of corresponding size, substantially as and for the purposes described.

8. A valve comprising a stator member having a flat face provided thereon, a rotor member having a flat face provided thereon arranged to seat on the flat face of the stator member, there being a center hole in the stator member and a registering socket in the rotor member, a valve stem extending through the center hole and having an operating connection with the rotor member in said socket, said stator member having ports in the flat face thereof communicating with passages therein and the rotor member having ports in the flat face thereof adapted to register with the other ports in different positions of said rotor, said rotor having passages therein extending between the ports so that communication is established between different passages of said stator member in different positions of the rotor member, a cap enclosing the rotor member and fastened to the stator member, and spring means acting between the cap and the rotor member and placed under load in the fastening of the cap to the stator member whereby the flat face of the rotor member is kept in close and substantially leak-proof contact with the flat face of the stator member, said rotor having a diametrically extending boss on the top thereof having one of the passageways of said member provided therein, and the spring means acting between the cap and rotor comprising a cross-shaped leaf spring having contact with the cap at its center and having two opposed legs thereof shorter than the other two opposed legs, the shorter legs resting on top of the diametrically extending boss on the rotor and the other legs resting on the rotor on opposite sides of said boss so that in the turning of said rotor the cross-shaped spring is caused to turn therewith and maintain the same position with relation thereto.

9. A valve comprising a stator member having a flat face provided thereon, a rotor member having a flat face provided thereon arranged to seat on the flat face of the stator member, there being a center hole in the stator member and a registering socket in the rotor member, a valve stem extending through the center hole and having an operating connection with the rotor member in said socket, said stator member having ports in the flat face thereof communicating with passages therein and the rotor member having ports in the flat face thereof adapted to register with the other ports in different positions of said rotor, said rotor having passages therein extending between the ports so that communication is established between different passages of said stator member in different positions of the rotor member, a cap enclosing the rotor member and fastened to the stator member, and spring means acting between the cap and the rotor member and placed under load in the fastening of the cap to the stator member whereby the flat face of the rotor member is kept in close and substantially leak-proof contact with the flat face of the stator member, said rotor having a diametrically extending boss on the top thereof having one of the passageways of said member provided therein, and the spring means acting between the cap and rotor comprising a cross-shaped leaf spring having contact with the cap at its center and having two opposed legs thereof shorter than the other two opposed legs, the shorter legs resting on top of the diametrically extending boss on the rotor and the other legs resting on the rotor on opposite sides of said boss so that in the turning of said rotor the cross-shaped spring is caused to turn therewith and maintain the same position with relation thereto, and a button having a shank portion fitting in a center hole provided in said cross-shaped spring, and having a rounded top surface arranged to have point contact with the inside of the cap.

10. A valve comprising a stator member having a flat face provided thereon, a rotor member having a flat face provided thereon arranged to seat on the flat face of the stator member, there being a center hole in the stator member and a registering socket in the rotor member, a valve stem extending through the center hole and having an operating connection with the rotor member in said socket, said stator member having ports in the flat face thereof communicating with passages therein and the rotor member having ports in the flat face thereof adapted to register with the other ports in different positions of said rotor, said rotor having passages therein extending between the ports so that communication is established between different passages of said stator member in different positions of the rotor member, a cap enclosing the rotor member and fastened to the stator member, and spring means acting between the cap and the rotor member and placed under load in the fastening of the cap to the stator member whereby the flat face of the rotor member is kept in close and substantially leak-proof contact with the flat face of the stator member, said spring means comprising an arched cross-shaped leaf spring having the four legs thereof bearing on top of the rotor member and having the center part thereof arranged for cooperation with the center of the cap, said spring having the legs thereof engaging the rotor member in such a way that in the turning of said rotor member the spring is caused to turn therewith so as to maintain the same position with reference thereto, said spring having a button mounted on the central portion thereof between the same and the cap, and the cap having a socket for reception of said button member whereby further to help in maintaining the spring in proper position.

11. A valve comprising a stator member having a flat face provided thereon, a rotor member having a flat face provided thereon arranged to seat on the flat face of the stator member, there being a center hole in the stator member and a registering socket in the rotor member, a valve stem extending through the center hole and having an operating connection with the rotor member in said socket, said stator member having ports in the flat face thereof communicating with passages therein and the rotor member having ports in the flat face thereof adapted to register with the other ports in different positions of said rotor, said rotor having passages therein extending between the ports so that communication is established between different passages of said stator member in different positions of the rotor member, a cap enclosing the rotor member and fastened to the stator member, and spring means acting between the cap and the rotor member and placed under load in the fastening of the cap to the stator member whereby the flat face of the rotor member is kept in close and substantially leak-proof contact with the flat face of the stator member, said spring means comprising an arched cross-shaped leaf spring having the four legs thereof bearing on top of the rotor member and having the center part thereof arranged for cooperation with the center of the cap, said spring having the legs thereof engaging the rotor member in such a way that in the turning of said rotor member the spring is caused to turn therewith so as to maintain the same position with reference thereto, and a button mounted on the central portion of said spring having a rounded surface arranged to have point contact with the cap, said cap having an annular wall serving to enclose the button and thereby help to maintain the spring in proper position.

12. A valve comprising a stator member having a flat face provided thereon, a rotor member having a flat face provided thereon arranged to seat on the flat face of the stator member, there being a center hole in the stator member and a registering socket in the rotor member, a valve stem extending through the center hole and having an operating connection with the rotor member in said socket, said stator member having ports in the flat face thereof communicating with passages therein and the rotor member having ports in the flat face thereof adapted to register with the other ports in different positions of said rotor, said rotor having passages therein extending between the ports so that communication is established between different passages of said stator member in different positions of the rotor member, a cap enclosing the rotor member and fastened to the stator member, and spring means acting between the cap and the rotor member and placed under load in the fastening of the cap to the stator member whereby the flat face of the rotor member is kept in close and substantially leak-proof contact with the flat face of the stator member, said spring means comprising a leaf spring arched for cooperation with the center of the cap, and button mounted on the central portion of said spring and fitting rotatably in a socket provided therefor on the inside of the cap whereby the spring is held in centered relation to the rotor and cap.

13. A valve comprising a body member having a flat face, and a valve member having a flat face cooperating with the flat face of the body member, one of the two members constituting a stator and the other a rotor shiftable relative thereto to different positions, the body member having a set of four ports therein equally spaced circularly on one radius and another set of four ports equally spaced circularly on a larger radius, the valve member having four ports provided therein equally spaced circularly on the same radius as the first set of ports in the body member and having two other ports disposed on the same radius as the other set of ports in the body member and in circularly spaced relation, there being passages in the body member communicating with the ports thereof, and there being one passage in the valve member communicating with diametrically opposed ports of the first set and two other passages in the valve member each establishing communication between one of the remaining ports of the first set and a port of the other set in the valve member.

14. A valve as set forth in claim 13 wherein the ports of one set in both members are offset angularly with reference to the ports of the other set to positions intermediate the same.

15. A valve as set forth in claim 13 wherein the ports of both sets in both members have the same included angle, the apex of which is at the common center of the two members, the lands between the ports in both members also having the same included angle, the included angle of the lands being greater than the included angle of the ports.

16. A valve as set forth in claim 13 wherein the ports of one set in both members are offset angularly with reference to the ports of the other set to positions intermediate the same, and wherein the ports of both sets in both members have the same included angle, the apex of which is at the common center of the two members, the lands between the ports in both members also having the same included angle, the included angle of the lands being greater than the included angle of the ports.

17. A valve comprising a body member having a flat face, and a valve member having a flat face provided thereon for cooperation with the flat face of the body member, the one member constituting a stator and the other a rotor shiftable to different positions with respect thereto, the one member having eight ports, four of which are in equally spaced relation circularly on one radius and the other four of which are in equally spaced relation circularly on a different radius, the ports of the one set having individual passages leading therefrom, and some of the ports of the other set likewise having individual passages leading therefrom but the remaining ports being in communication with a common passage, and the other member having one set of four ports in equally spaced relation on one radius to cooperate with the one set of ports in the first member and another set of two ports on another radius to cooperate with the other ports of the first member, two of the ports of the set of four in the second member being interconnected by a passageway in said member, and the remaining two ports being connected with the two ports of the other set by two separate passages provided in said member, the ports in the one member being arranged to register with different ports in the other member in different positions thereof.

18. A valve as set forth in claim 17 wherein the interconnected ports of the first mentioned member have communication with a pipe leading from said member, the one port having restricted communication with said pipe.

19. A valve as set forth in claim 17 wherein all of the ports in the first mentioned member have the same included angle with the apex at the common center of the two members, the ports being of such size that the included angle of the lands between the ports is greater than the included angle of the ports themselves, and the ports in the other member adapted to register therewith being of corresponding size with the lands therebetween likewise of corresponding size.

20. A valve comprising a stator member having a flat face provided thereon, a rotor member having a flat face provided thereon arranged to seat on the flat face of the stator member, there being a center hole in the stator member and a registering socket in the rotor member, a valve stem extending through the center hole and having an operating connection with the rotor member in said socket, said stator member having ports in the flat face thereof communicating with passages therein and the rotor member having ports in the flat face thereof adapted to register with the other ports in different positions of said rotor, said rotor having passages therein extending between the ports so that communication is established between different passages of said stator member in different positions of the rotor member, a cap enclosing the rotor member and fastened to the stator member, and spring means acting between the cap and the rotor member and placed under load in the fastening of the cap to the stator member whereby the flat face of the rotor member is kept in close and substantially leak-proof contact with the flat face of the stator member, said rotor having a diametrically extending boss on the top thereof having one of the passages of said member provided therein, and the spring means acting between the cap and rotor comprising an arched leaf spring having the ends thereof engaging on top of the rotor on opposite sides of the boss so that in the turning of the rotor the spring is caused to turn therewith, said spring cooperating with the cap intermediate its ends and being held in a predetermined relation thereto.

21. A valve comprising a stator member having a flat face provided thereon, a rotor member having a flat face provided thereon arranged to seat on the flat face of the stator member, there being a center hole in the stator member and a registering socket in the rotor member, a valve stem extending through the center hole and having an operating connection with the rotor member in said socket, said stator member having ports in the flat face thereof communicating with passages therein and the rotor member having ports in the flat face thereof adapted to register with the other ports in different positions of said rotor, said rotor having passages therein extending between the ports so that communication is established between different passages of said stator member in different positions of the rotor member, a cap enclosing the rotor member and fastened to the stator member, and spring means acting between the cap and the rotor member and placed under load in the fastening of the cap to the stator member whereby the flat face of the rotor member is kept in close and substantially leak-proof contact with the flat face of the stator member, said rotor having a diametrically extending boss on the top thereof having one of the passages of said member provided therein, and the spring means acting between the cap and rotor comprising an arched leaf spring having the ends thereof engaging on top of the rotor on opposite sides of the boss so that in the turning of the rotor the spring is caused to turn therewith, and a button mounted on the central portion of said spring and bearing on the inside of the cap to permit turning of the spring easily with reference to the cap.

22. A valve as set forth in claim 21 wherein the button is held in a predetermined position with reference to the spring by the engagement of a projection on the one part in a recess provided on the other part.

23. A valve as set forth in claim 21 wherein the button is held in a predetermined position with reference to the spring by the engagement of a projection on the one part in a recess provided on the other part, and wherein the button is held in a predetermined position with reference to the cap by the engagement of the one part in a recess provided in the other part.

In witness of the foregoing I affix my signature.

ROBERT H. COLVIN.